United States Patent [19]

Murayama et al.

[11] 3,723,754
[45] Mar. 27, 1973

[54] NON-THROMBOGENIC ARTICLES

[75] Inventors: Naohiro Murayama; Makoto Fukuda, both of Iwaki-shi, Fukushima-ken, Japan

[73] Assignee: Kureha Kagaku Kogyo Kabushiki Kaisha, Tokyo-to, Japan

[22] Filed: Aug. 27, 1971

[21] Appl. No.: 175,730

[30] Foreign Application Priority Data

Aug. 27, 1970 Japan ................................45/75116

[52] U.S. Cl. ............307/88 ET, 179/111 E, 264/345
[51] Int. Cl. ..............................................G11c 19/00
[58] Field of Search..........307/88 ET; 29/25.14, 569; 264/345; 179/111 E

[56] References Cited

UNITED STATES PATENTS 3,660,736  5/1972  Igarashi...........................307/88 ET

OTHER PUBLICATIONS

Journal of the Electrochemical Society "Foil Electrets & Their Use in Condenser Microphones" by Sessler et al., vol. 115, no. 8, 8/68, p. 836–841.

*Primary Examiner*—Stanley M. Urynowicz, Jr.
*Attorney*—Richard C. Sughrue et al.

[57]  ABSTRACT

A non-thrombogenic article comprising: an electret having a stable heterocharge, prepared by decaying away the unstable heterocharge and homocharge of an electret, which is produced from a polymer in a conventional manner, said article being such that the negative-charge bearing surface of said electret forms the surface of the article to be brought into contact with the blood.

4 Claims, No Drawings

NON-THROMBOGENIC ARTICLES

BACKGROUND OF THE INVENTION

1. Field of the Invention

The present invention relates to a material suitable used as a substitute for living organs of animals or suitable used in an apparatus in which plastics are used for treating the blood of animals.

2. Description of the Prior Art

Owing to the good workability, toughness, flexibility, sterilizable property, less reactivity in animal bodies, etc., plastics are very suitably used as the materials for artificial blood vessels or other artificial internal organs, but are deficient in that they coagulate blood at the interface between the plastic and the blood. In spite of such a defect, various kinds of plastics are used as artificial internal organs at the portions to be brought into contact with the blood of animals, and in particular, man, for example, an artificial blood vessel, artificial heart, artificial kidney, etc., or used as vessels for preserving or transporting blood. However, in such cases an anti-thrombogenic material must be incorporated in blood for preventing the blood from being coagulated.

Furthermore, for reducing the thrombogenic property of plastics there is known a method in which an anti-thrombogenic material is kneaded into the plastics, a method in which an anti-thrombogenic material is grafted to the surfaces of the plastics, and a method in which a negative charge is provided on the surfaces of the plastics.

Among these methods, an electret is known as a material having a negative charge. It is known that an electret reduces the occurence of coagulation of blood in animal bodies owing to the presence of a negative charge, but the conventional electret has not yet been practically used for these purposes, since the charge of the electret will decay quickly in a conductive solution, such as blood or Ringer's solution.

SUMMARY OF THE INVENTION

Therefore, an object of this invention is to provide a non-thrombogenic plastic article, such as tubes or vessels made of an electret suitable for storing or transporting blood.

As the result of many years of investigating the electret, applicants have discovered an electret having a stable heterocharge prepared by treating at a high temperature or in the presence of water, an electret, which is produced from a polar polymer in a conventional manner. This electret has a very long life in water, an aqueous sodium chloride solution, a Ringer's solution, etc., and also can prevent the coagulation of blood when it is brought into contact with static blood.

In general, an electret is produced by maintaining a starting material for a definite period of time at temperatures of from 80° to 170°C under a D.C. high electric field and thereafter cooling the material to room temperative while maintaining the application of the high electric field. An electret has the homocharge (a charge having the same polarity as that of the electrode that was brought into contact with the electret at the formation thereof) or a heterocharge (a charge having the opposite polarity to that of the homocharge) according to the conditions employed when producing the electret. In general, the electret shows a heterocharge or a comparatively week homocharge immediately after the production thereof, but the heterocharge decays away in a short period of time to provide an electret having a large homocharge. Also, when the electret immediately after polarization is maintained at a high temperature over room temperature, the time for the conversion of the heterocharge to the homocharge is remarkably shortened and a state having a high homocharge can be attained in a short period of time.

Such a heterocharge is generally unstable and a comparatively stable homocharge is believed to be desirable as the charge for the electret. Thus, the electret having the stable homocharge is practically used as materials for microphones or speakers used at room temperature. However, because the homocharge on the opposite surfaces of the electret decays quickly in blood or in a medical steam sterilizer used when such an electret is used as a material to be brought into contact with blood, such an electret can not be used for the purpose intended according to the conditions of use.

The inventors have discovered that a highly stable heterocharge can be imparted to an electret after removing forcibly the stable homocharge at room temperature. That is, when an electret prepared in a conventional manner is treated at a high temperature or in the presence of water, such as, by water, an electrolyte solution, or steam, the conversion of the charge occurs by the decay of the heterocharge, which produces a large homocharge and finally, the homocharge decays to remove the charge completely from the surfaces of the electret. However, when the electret is further treated continuously after the entire charge is removed, a considerably large heterocharge astonishingly appears again. The generated heterocharge again is far more stable than the homocharge that had hitherto been considered to be a stable charge and the electret exhibiting the stable heterocharge prepared by the aforesaid method can maintain its charge over a far longer period of time than an electret having the homocharge prepared by conventional means.

DETAILED DESCRIPTION OF THE INVENTION

The original electret used in this invention may be prepared by any method. For example, when the electret is prepared by directly bringing the material for the electret into contact with electrodes, an electret showing a heterocharge is first formed and then the electret is gradually converted into one exhibiting a stable homocharge. When the formation of the electret is conducted by inserting a gas permeable material, such as a paper between the electrode and the material, an electret having a weak homocharge is first formed, the homocharge being increased with the passage of time, and finally, an electret having a stable homocharge at room temperature is formed.

In the present invention, such a stabilized electret as well as the electret having a heterocharge and a weak homocharge immediately after the production of the electret may be employed. The electret having the heterocharge first is once converted into an electret having a homocharge, and then it is again converted into an electret having a stable heterocharge.

Also, the intensity of the electric field to be applied when preparing the electret may be employed if it is lower than the breakdown voltage without restriction, but the voltage is desirably higher. Ordinarily an electric field intensity of 1–300 Kg/cm is used. Also, the temperature employed when forming the electret depends upon the nature of the resin to be employed, but it may be higher than the glass transition point of the resin. In addition, conductive materials, such as aluminum, copper, stainless steel, iron, a solution of an electrolyte, etc., may be used as the electrodes and also by changing the shape of the electrode, various electret shapes can be prepared.

The electret having the homocharge obtained by the ordinary method can be converted into an electret having a stable heterocharge by subjection to heat treatment at a high temperature between the glass transition point and the melting point of the base material of the electret in air, with or without being wrapped by a tin foil or an aluminum foil, whereby the homocharge decays away quickly and only a heterocharge remains. When the electret thus treated is placed in water at room temperature for longer than 3 months, it exhibits no decay of the charge.

The electret having the stable heterocharge may be prepared by utilizing the phenomenon that the decay of the homocharge of an original electret is very fast in water. In this case, when the electret having the homocharge is placed in water at 50°C, the homocharge decays away after 5 days and only the stable heterocharge remains. The temperature for the treatment is desirably higher because the period of time for forming the stable heterocharge is shortened. The electret having the stable heterocharge prepared by the aforesaid process shows almost no decay of charge after 3 months or has a semi-permanent life-time.

It has been found than when a clotting test of animal blood was conducted about the negative-charge surface of the stable electret, the blood was very difficult to be coagulated as compared with material which had not been converted to the electret and the positive charge surface of the electret.

Thus, the present invention relates to a non-thrombogenic article composed of an electret having a stable heterocharge, which is so constructed that only the negative-charge bearing surface of the electret is brought into contact with the blood. For example, in the case of producing a tubular electret by utilizing the inside wall of the tube, a method may be employed in which the electrode positioned in the tube acts as an anode.

Usually, the formation of the electret is carried out in the final shape, such as a tube or vessel, but in some cases, a sheet-shaped electret having a stable heterocharge is prepared and the sheet is shaped into a tube or a vessel so that the inside surface (the surface to be brought into contact with the blood) is a negative-charged surface.

In addition, as the base material for the electret of this invention, there are illustrated polar polymers, such as polyvinylidene fluoride, polyvinylidene chloride, acrylic resins, polyesters, etc., copolymers of the same, and a mixture thereof.

A better understanding of the present invention will be gained from the following examples, which are merely intended to be illustrative and not limitative of the present invention.

EXAMPLE 1

A sheet of 1 mm in thickness prepared by extrusion-molding a kneaded mixture of 60 parts by weight of polyvinylidene chloride and 40 parts of methyl polymethacrylate was sandwiched with stainless steel electrodes at the opposite sides, maintained at a constant temperature of 120°C for 1 hour while applying a D.C. potential of 7.0 KV (electric field intensity of 70 KV/cm) to both electrodes, and then cooled to room temperature over a period of 1.5 hours while continuing the application of the D.C. potential. When the surface potential of the electret thus prepared was measured by means of a rotary sector type potentiometer with an interval between the electret and the electrode of 1 cm, the electret was observed to have a homocharge of about 1,800 volts. Then the electret was wrapped with an aluminum foil and heat treated for 3 hours at 130°C. By this treatment the initial homocharge decayed away and the electret having a heterocharge of about 200 volts was formed. The heterocharge of the electret obtained was quite stable and when the electret was placed in water at room temperature, the decay of the charge was scarcely observed different from an ordinary electret having a homocharge, and even when it was preserved in air at 80°C, the decay of the charge was also scarcely observed.

The time constant (tua: the gradient of the variation of the surface potential) of the decay of the surface potential of each of the electret having the heterocharge prepared by this invention and a conventional electret having a homocharge in air at 100° or 80°C or in water at room temperature was measured, the results of which are shown in the following table:

TABLE 1

| Preservation condition | Decay time of surface potential | |
|---|---|---|
| | Homocharge | Heterocharge |
| 130°C | 0.1 hour | 3000 hours |
| 100°C | 100 hours | 5000 hours |
| 80°C | 600 hours | longer than a year |
| Room temp. in water | 150 hours | longer than a year |

Subsequently, a clotting test was conducted with the electret.

That is, 0.3 ml. of venous rabbit blood was placed on a glass plate, the positive-charge bearing surface of the electret, the negative-charge bearing surface of the electret, or the surface of the sheet, which had not been subjected to the treatment of producing electret.

While observing the state of coagulated blood on the sample, the period of time required for the blood to attach to a pin in a fibrous state and the pin pulled threads when the pin was brought into contact with the surface of the blood on the sample and drawn up from the surface was measured. The results are shown in the following table:

TABLE 2

| Sample No. | Sample | Surface potential | The thrombosis time |
|---|---|---|---|
| 1. | Glass plate | | 16 minutes |
| 2. | Polymer sheet not formed into electret | | 27 minutes |
| 3. | Positive surface of the electret of this invention | +150 volts | 19 minutes |
| 4. | Negative surface of the electret of this | −170 volts | 42 minutes |

| | | | |
|---|---|---|---|
| 5. | Negative surface of ordinary electret showing homocharge | −700 volts | 45 minutes |
| 6. | Positive surface of ordinary electret showing homocharge | +500 volts | 21 minutes |

As shown above, the negative-charge bearing surface of the electret of this invention exhibited excellent results as compared with the glass plate and the sheet which was not polarized.

Then, each surface of the ordinary electret having the homocharge (negative charge bearing surface)(Sample No. 5), which showed the most excellent result in the above table and the electret of this invention (negative charge bearing surface)(Sample No. 4) was sterilized for 1 hour in a medical steam sterilizer and then the coagulation test was conducted in the same manner as above. The results are shown in Table 3:

TABLE 3

| Sample No. | Sample | Surface potential | The thrombosis time |
|---|---|---|---|
| 2. | Non-polarized polymer | | 27 minutes |
| 4. | Negative surface of the electret of this invention | −170 volts | 42 minutes |
| 5. | Negative surface of ordinary electret | +80 volts | 23 minutes |

As shown in Table 3, the ordinary electret having a homocharge lost the homocharge after the steam sterilization and heterocharge having the opposite polarity to that of the homocharge. Thus, the surface having the negative charge before sterilization had a positive charge after sterilization and hence the coagulation action of the blood was promoted by the surface. On the other hand, the electret having the stable heterocharge of this invention exhibited no decay of charge and thus the thrombosis time was not changed.

In addition, the thrombosis time of the blood described in this example was measured with fresh and complete blood in a static state and the thrombosis period of time was remarkably prolonged by using the negative charge bearing surface of the electret of this invention when the test was conducted for running complete blood or blood under a dynamic condition.

EXAMPLE 2

The sheet used in Example 1 was treated in the same manner as in Example 1 to provide an electret and the electret thus prepared was preserved in water at 50°C. When the surface potential of the electret was measured by means of a rotary sector type potentiometer with an interval of 1 cm between the electret and the electrode, the electret was observed to have a homocharge of about 1,800 volts first, but after 5 days the electret had a heterocharge of about 200 volts. The electret finally obtained exhibited almost no decay of charge as in Example 1 when it was placed in air or water; that is, the electret having a stable heterocharge was obtained.

Then, the clotting test on the surface of the electrets was conducted as in Example 1 and results, the same as in Example 1 were obtained. The results are shown in the following table:

TABLE 4

| Sample No. | Sample | Surface potential | The thrombosis time |
|---|---|---|---|
| 1. | Glass plate | | 16 minutes |
| 2. | Non-polarized polymer | | 27 minutes |
| 3. | Positive surface of the electret of this invention | +190 volts | 20 minutes |
| 4. | Negative surface of the electret of this invention | −200 volts | 40 minutes |
| 5. | Negative surface of ordinary electret | −700 volts | 45 minutes |
| 6. | Positive surface of ordinary electret | +500 volts | 21 minutes |

Each of the negative surfaces of the ordinary electret having a homocharge (Sample No. 5) showed the most excellent results in the above table and the electret of this invention having a heterocharge of this invention (Sample No. 4) was sterilized for one hour in a medical steam sterilizer and thereafter, the coagulation test was conducted by the same manner as in Example 1, the results of which are shown in the following table:

TABLE 5

| Sample No. | Sample | Surface potential | Time until blood coagulated |
|---|---|---|---|
| 2. | Non-polarized electret | | 27 minutes |
| 4. | Negative surface of electret of this invention | −180 volts | 40 minutes |
| 5. | Negative surface of ordinary electret | +80 volts | 23 minutes |

As is shown in Table 5, the charge of the ordinary electret having a homocharge decayed after sterilization and the heterocharge having the opposite polarity to that of the homocharge appeared. Thus, the surface of the ordinary electret having the negative charge before sterilization had a positive charge after sterilization and the coagulation action of the blood was promoted. However, the electret having the stable heterocharge of this invention exhibited no decay of charge and the thrombosis time of the blood by the electret was not changed.

Although the present invention has been adequately set forth and described in the foregoing specification and claims included therein, it is readily apparent that various changes and modifications may be made without departing from the scope and spirit thereof.

What is claimed is:

1. A non-thrombogenic article comprising: an electret having a stable heterocharge, prepared by decaying away with water or heat the unstable heterocharge and homocharge of an electret, which is produced from a polar polymer in a conventional manner, said article being such that the negative-charge bearing surface of said electret forms the surface of the article brought into contact with blood.

2. The non-thrombogenic article of claim 1, wherein the unstable heterocharge and homocharge of the original electret are decayed away by heat-treating the electret.

3. The non-thrombogenic article of claim 1, wherein the unstable heterocharge and homocharge of said original electret are decayed away by treating the electret in the presence of water.

4. The non-thrombogenic article of claim 1, wherein said polar polymer is a member selected from the group consisting of polyvinylidene fluoride, polyvinylidene chloride, acrylic resins, polyesters, copolymers of said polymers and mixtures thereof.

* * * * *